Patented May 30, 1950

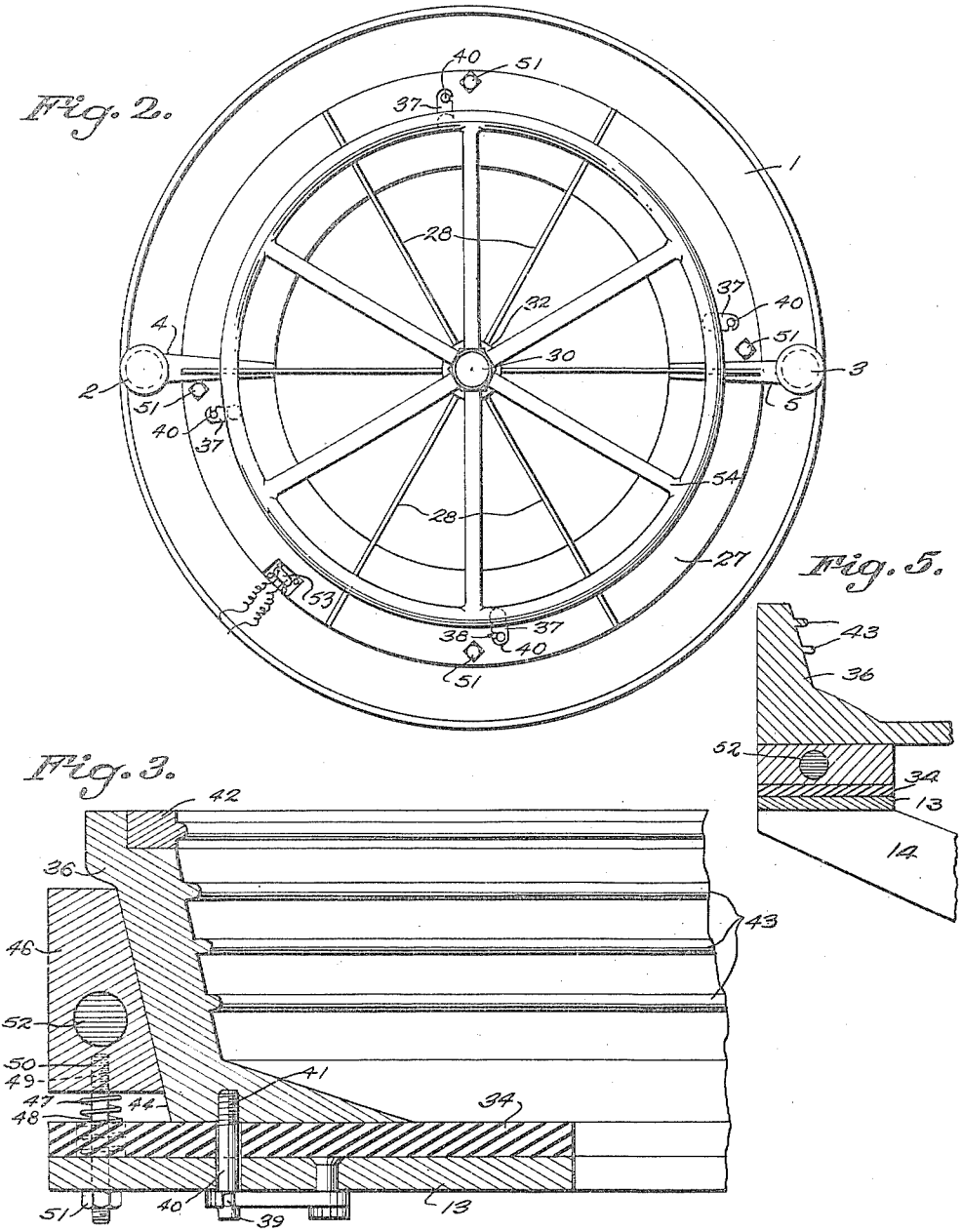

2,509,830

UNITED STATES PATENT OFFICE 2,509,830

RECAP MOLD FOR TIRE CASINGS

Donald M. MacMillan, Macon, Ga.

Application August 18, 1948, Serial No. 44,859

8 Claims. (Cl. 18—18)

This invention relates to improvements in tire casing recap molds.

An object of the invention is to provide an improved tire casing recap mold which will top cap and full cap a tire casing without heating the side walls of the tire casing.

Another object of the invention is to provide an improved tire casing recap mold which will be operative with either inside curing rims or regular flat base or road rims.

A further object of the invention is to provide an improved tire casing recap mold which will be provided with a fixed pressure plate and a movable pressure plate upon which insulating plates will be supported, and cooperating matrix sections detachably supported on the insulating plates by means of pivoted latches supported on the pressure plates and studs threaded into the matrix sections and engageable by said latches for holding the matrix sections in fixed position.

Another object of the invention is to provide an improved tire casing recap mold which will include cooperating matrix sections and resiliently mounted heater rings having tapered contact surfaces adapted to slidably and adjustably contact the outer surfaces of said matrix sections to provide perfect contact while permitting expansion of the matrix sections when heated.

A still further object of the invention is to provide an improved tire casing recap mold having a one-piece circular tapered heater ring having a one-piece circular heat unit molded therein and controlled by a suitable thermostat connected therewith.

Another object of the invention is to provide an improved tire casing recap mold which will be highly efficient in operation and relatively inexpensive to manufacture and produce.

Other objects will appear as the description proceeds.

In the accompanying drawings which form a part of this application:

Figure 2 is a top plan view of the improved tire casing recap mold;

Figure 3 is an enlarged detail sectional view through one of the matrix sections and heater ring therefor, together with the insulating plate and pressure plate used for supporting the matrix section;

Figure 4 is a plan view of one of the pivoted latches for attaching the matrix sections to the pressure plates, and Figure 5 is a detail view showing a slightly modified form of matrix section with the heater ring contacting the side wall thereof.

Like characters of reference are used throughout the following specification and the accompanying drawings to designate corresponding parts.

Figure 1:
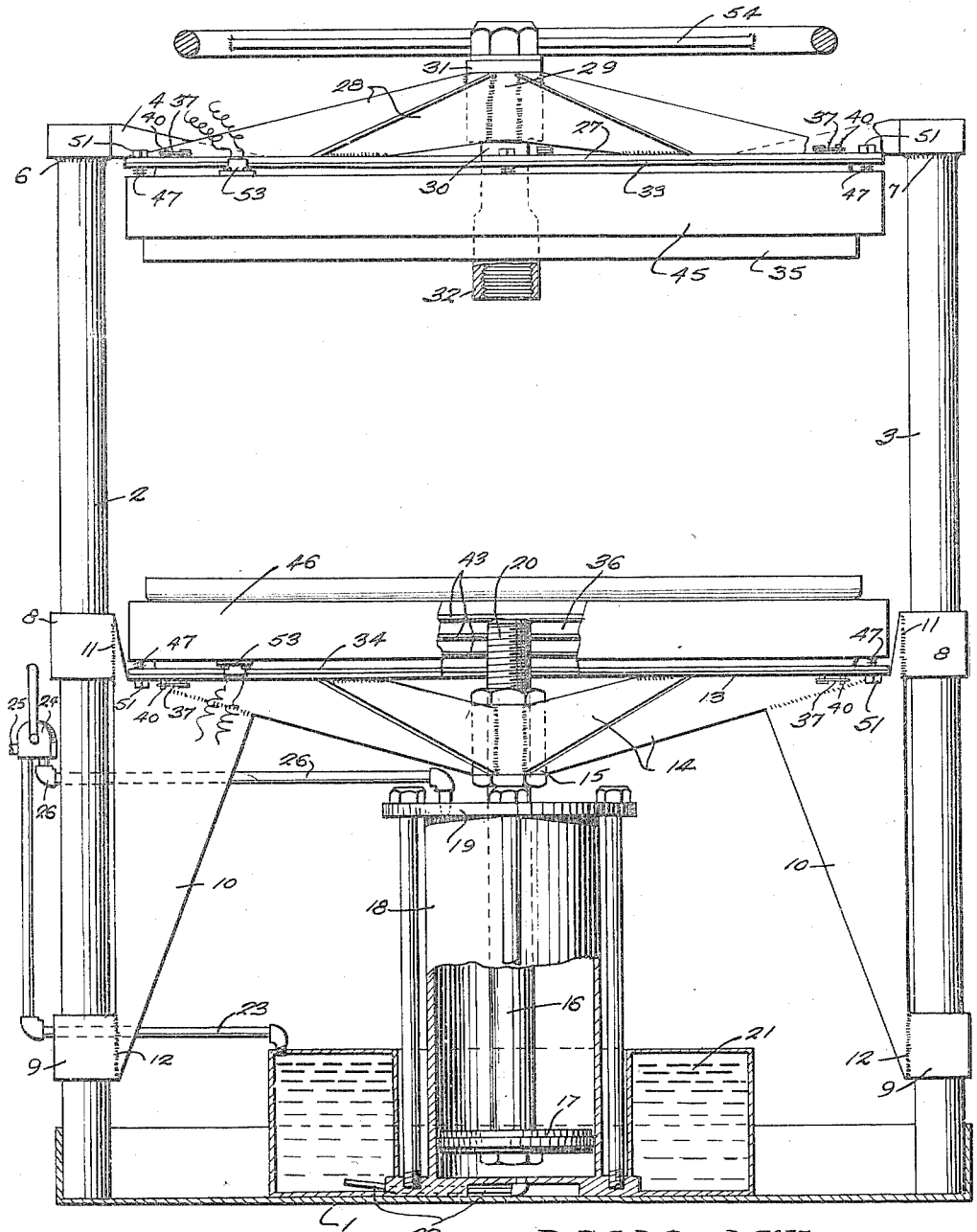
Figure 1 is a side elevation of the improved tire casing recap mold with portions thereof being broken away and in section to show the internal construction thereof.

In carrying out the invention, there is provided an improved form and construction of tire casing recap mold including a supporting base 1 to which is attached the oppositely disposed vertical guide posts 2 and 3. Inwardly extending mounting brackets 4 and 5 are welded at 6 and 7 to the upper ends of the guide posts 2 and 3, as clearly shown in Figure 1.

Vertically spaced guide sleeves 8 and 9 are connected together by means of the connecting webs 10 which are welded to said guide sleeves at points 11 and 12, and are slidably mounted upon said guide posts 2 and 3. The connecting webs 10 are also attached to the circular metal pressure plate 13, which is also supported by the radially extending spokes 14 of the pressure plate 13. A central hub 15 is formed at the inner ends of the spokes 14, and is mounted about the upper end of the piston rod 16, upon the lower end of which the piston 17 is supported for vertical movement in the cylinder 18 supported centrally of the base 1. A cylinder head 19 is provided for the upper end of the cylinder 18, and is centrally apertured to permit the movement of the piston rod 16 therethrough. The upper end of the piston rod 16 is externally threaded as at 20 for purposes hereinafter more fully described.

A hydraulic fluid reservoir 21 is disposed about the cylinder 18, being connected at its lower end with the lower end of the cylinder 18 by means of the pipe 22. An air line or pipe 23 is connected with the upper end of the reservoir 21 and to an air control valve 24 which is provided with an air inlet 25 for connection with a main air supply line (not shown). An air line or pipe 26 is connected between the control valve 24 and the cylinder head 19 for admitting air under pressure to the upper end of the cylinder 18 when the air control valve 24 is actuated. It will therefore be seen that the hydraulic fluid will enter only below the piston 17 in the cylinder 18 and air under pressure will enter the cylinder 18 above the piston 17.

An upper metal pressure plate 27 of circular formation will be fixed to the inwardly extending mounting brackets 4 and 5, and will be provided with the radially extending spokes 28 and the centrally and axially disposed hub 29, through which the vertical coupling rod 30 will be disposed, being rotatably mounted in the bearing 31 disposed above the hub 29. An internally threaded coupling sleeve 32 will be disposed upon the lower end of the coupling rod 30 for threadably engaging and securing the threaded upper end 20 of the piston rod 16 when the piston 17 is moved to the upper end of the cylinder 18 by admitting the hydraulic fluid from the tank or reservoir 21 below the piston 17, at which time the pressure plates 13 and 27 will be in close proximity to each other.

Insulating plates 33 and 34 will be disposed in contact with the lower surface of the upper pressure plate 27 and in contact with the upper surface of the movable pressure plate 13.

Upper and lower matrix sections 35 and 36 will be supported in contact with the insulating plates 33 and 34 by the pressure plates 27 and 13 by means of the pivot latches 37 pivotally mounted upon the rivet bolts 38 secured to the pressure plates 27 and 13. The pivot latches 37 will be notched at 38 to engage and lock in the annular grooves 39 formed in the studs 40 which are threaded at 41 for threading into the matrix sections 35 and 36, thus detachably securing the matrix sections 35 and 36 to the pressure plates 27 and 13.

The matrix sections 35 and 36 will be adapted to support a matrix spacer ring 42, and will be formed on their inner surfaces with the circumferentially disposed tread design forming rings 43.

The outer peripheral sides of the matrix sections 35 and 36 will be tapered or sloping as at 44, for cooperating with the tapered or sloping inner surfaces of the one-piece metal heater rings 45 and 46 which are resiliently mounted upon the coil springs 47 disposed about the bolts 48 which are threaded at 49 for being received within the threaded sockets 50 in the heater rings 45 and 46. The bolts 48 will extend through the adjacent insulating plates and pressure plates being held in secure position by means of the nuts 51.

A one-piece circular heat unit 52 will be cast within each of the heater rings 45 and 46, and provides a high degree of efficiency plus a long heat unit life. A thermostat 53 will be mounted upon each of the heater rings 45 and 46, and will be connected with the heat units 52 and with a source of electric current supply (not shown) for controlling the temperature of the heater rings 45 and 46.

Inasmuch as the sloping surfaces of the matrix sections 35 and 36 contact and extend parallel with the sloping sides of the heater rings 45 and 46, there will be a perfect contact between the same at all times, and especially when the matrix sections 35 and 36 expand, causing the heater rings 45 and 46 to slide slightly upon the sloping walls or surfaces of the matrix sections 35 and 36, this being made possible by the resilient mounting of the heater rings 45 and 46.

A locking bolt actuating wheel 54 will be secured upon the upper end of the coupling rod 30 for rotating the same and the coupling sleeve 32 to lock the sleeve 32 to the threaded upper end 20 of the piston rod 16 when the matrix sections 35 and 36 are in closed relation.

In operation, the lower matrix section 36 will be lowered by having the piston 17 in the lower end of the cylinder 18, and a tire casing to be recapped will be set in the said matrix section with its curing rim (not shown), and the hydraulic fluid is admitted below the piston 17 in the cylinder 18, causing the same and the matrix section 36 supported thereby to be elevated until it is disposed adjacent the upper matrix section 35, at which time the actuating wheel 54 will be rotated to cause the coupling sleeve 32 to thread upon and lock the threaded upper end 20 of the piston rod 16, thus supporting the matrix sections 35 and 36 in closed position and in the proper position for recapping the tire casing held therein.

The detail modified view shown in Figure 5 shows a slightly different form of matrix section 36 and a heater ring 46 in contact with the side of the matrix section rather than in contact with the peripheral edge thereof, as shown in the other figures of the drawings.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A recap mold for tire casings including a supporting base, a plurality of guide posts extending upwardly therefrom, inwardly directed mounting brackets on the upper ends of said guide posts, a circular pressure plate fixed to said mounting brackets, a lower circular pressure plate slidably supported upon said guide posts for movement toward and away from said fixed pressure plate, cooperating matrix sections detachably supported by said pressure plates, heating rings resiliently supported by said pressure plates having engagement with the outer peripheral surfaces of said matrix sections, and a hydraulic jack connected with said lower pressure plate for raising the same towards the fixed pressure plate and for lowering the lower pressure plate away from the fixed pressure plate.

2. A recap mold for tire casings including a supporting base, a plurality of guide posts extending upwardly therefrom, inwardly directed mounting brackets on the upper ends of said guide posts, a circular pressure plate fixed to said mounting brackets, a lower pressure plate slidably supported upon said guide posts for movement toward and away from said fixed pressure plate, cooperating matrix sections detachably supported by said pressure plates, insulation plates disposed between said pressure plates and said matrix sections, heating rings resiliently supported by said pressure plates having engagement with the outer peripheries of the matrix sections, heating units cast within said heating rings, and hydraulic means connected with the lower pressure plate for raising and lowering the same and said lower matrix section toward and away from said fixed pressure plate and upper matrix section.

3. A recap mold for tire casings including a supporting base, a plurality of vertical guide posts extending upwardly therefrom, inwardly directed mounting brackets on the upper ends of said guide posts, a circular pressure plate fixed to said mounting brackets, a lower pressure plate slidably supported upon said guide posts for movement toward and away from said fixed pressure plate, cooperating upper and lower matrix sections, latches on the upper and lower pressure plates for securing said matrix sections thereon, insulating plates disposed between said pressure plates and said upper and lower matrix sections, said matrix sections having sloping peripheral outer surfaces, heating rings having sloping inner surfaces resiliently supported by said pressure plates and having engagement with the sloping outer surfaces of said matrix sections, heating units cast within said heating rings, hydraulic jack means connected with said lower pressure plate for selectively raising and lowering the same, a threaded locking stud disposed axially of said lower pressure plate and being vertically movable therewith, and a lockable coupling sleeve mounted axially of the upper pressure plate being engageable with said locking stud when said lower pressure plate and matrix section are in raised position adjacent the upper pressure plate and upper matrix section for locking said matrix sections together upon a tire casing when being recapped.

4. A recap mold for tire casings including a supporting base, a plurality of vertical guide posts extending upwardly therefrom, inwardly directed mounting brackets on the upper ends of said guide posts, a circular pressure plate fixed to said mounting brackets, a lower pressure plate slidably supported upon said guide posts for movement toward and away from said fixed pressure plate, cooperating upper and lower matrix sections, locking lugs on said matrix sections, pivoted latches on said pressure plates engageable with said locking lugs for detachably securing the matrix sections to said pressure plates, insulating plates disposed between said pressure plates and said matrix sections, said matrix sections having sloping outer peripheral surfaces, heating rings having sloping inner surfaces engageable with the sloping surfaces on said matrix sections, heating units cast within said heating rings, a thermostat for controlling the heat of each heating unit, a hydraulic jack including a cylinder and piston with piston rod disposed for vertical movement therein, said piston rod being attached to said lower pressure plate and formed with a threaded upper locking stud, and a lockable coupling sleeve mounted axially of the upper pressure plate being engageable with said threaded locking stud when said lower pressure plate and matrix section are in raised position adjacent the upper pressure plate and upper matrix section for locking said matrix sections together upon a tire casing when being recapped.

5. The subject matter as claimed in claim 4, and vertically spaced guide sleeves slidably mounted on said guide posts and disposed between said guide posts and said lower pressure plate.

6. The subject matter as claimed in claim 4, vertically spaced guide sleeves slidably mounted on said guide posts and disposed between said guide posts and said lower pressure plate, and reinforcing webs disposed between said vertically spaced guide sleeves.

7. The subject matter as claimed in claim 4, vertically spaced guide sleeves slidably mounted on said guide posts and disposed between said guide posts and said lower pressure plate, reinforcing webs disposed between said vertically spaced guide sleeves, and a locking wheel operatively connected with said coupling sleeve for securing the same to said threaded locking stud and for releasing the same therefrom.

8. The subject matter as claimed in claim 4, and means for admitting pneumatic pressure into said cylinder above said piston.

DONALD M. MacMILLAN.

REFERENCES CITED

The following references are of record in the file of this patent:

UNITED STATES PATENTS

| Number | Name | Date |
| --- | --- | --- |
| 567,457 | Doughty | Sept. 8, 1896 |
| 1,242,365 | Nall | Oct. 9, 1917 |
| 2,058,233 | Iverson | Oct. 20, 1936 |
| 2,198,493 | Freeman | Apr. 23, 1940 |
| 2,267,243 | MacMillan | Dec. 23, 1941 |
| 2,295,438 | Vaniman | Sept. 8, 1942 |
| 2,335,878 | Oren | Dec. 7, 1943 |